United States Patent [19]
Hwang

[11] Patent Number: 5,960,172
[45] Date of Patent: Sep. 28, 1999

[54] DIGITAL COMPUTER SYSTEM SECURITY DEVICE

[75] Inventor: Seung-Hwe Hwang, Kyungki-do, Rep. of Korea

[73] Assignee: SamSung Electronics Co., Ltd., Suwon, Rep. of Korea

[21] Appl. No.: 08/777,067

[22] Filed: Dec. 30, 1996

[30] Foreign Application Priority Data

Dec. 30, 1995 [KR] Rep. of Korea ................. 95-68217

[51] Int. Cl.$^6$ ................................................... H04F 1/00
[52] U.S. Cl. ............................................. 395/186; 380/25
[58] Field of Search ........................ 395/186, 187.01, 395/188.01; 380/3, 4, 23, 25

[56] References Cited

U.S. PATENT DOCUMENTS

| | | |
|---|---|---|
| 5,103,221 | 4/1992 | Memmola . |
| 5,202,997 | 4/1993 | Arato . |
| 5,261,070 | 11/1993 | Ohta . |
| 5,311,591 | 5/1994 | Fischer . |
| 5,355,414 | 10/1994 | Hale et al. ................ 380/25 |
| 5,369,394 | 11/1994 | Quirk et al. . |
| 5,388,211 | 2/1995 | Hornbuckle . |
| 5,434,562 | 7/1995 | Reardon . |
| 5,454,032 | 9/1995 | Pinard et al. ............. 379/167 |
| 5,465,341 | 11/1995 | Doi et al. . |
| 5,481,253 | 1/1996 | Phelan et al. . |
| 5,542,045 | 7/1996 | Levine . |
| 5,548,721 | 8/1996 | Denslow . |
| 5,610,981 | 3/1997 | Mooney et al. ............ 380/25 |

*Primary Examiner*—Albert DeCady
*Attorney, Agent, or Firm*—Robert E. Bushnell, Esq.

[57] ABSTRACT

A security device for a digital computer system having a peripheral device and peripheral device controller, includes a security user input/output unit which displays the contents stored in the peripheral device and receives the information for the protection of the peripheral device, a security system controller which is connected to the security user input/output unit, and protects and controls the peripheral device, and a security controller which is connected to the security system controller, the peripheral device controller and the peripheral device, and protects the peripheral device from being controlled by the peripheral device controller to provide a security device operated under another operating system by using hardware, thereby allowing a computer system to interface with an input/output device or a file in a normal state while the security device protects the computer system.

20 Claims, 3 Drawing Sheets

DIGITAL COMPUTER SYSTEM SECURITY DEVICE

CLAIM OF PRIORITY

This application make reference to, incorporates the same herein, and claims all benefits accuring under 35 U.S.C. §119 from an application Entitled Digital Computer System Security Device earlier filed in the Korean Industrial Property Office on Dec. 30, 1995 and assigned Ser. No. 95-68217.

FIELD OF THE INVENTION

The present invention relates to a security device for a computer system, more particularly, to the security device which can be operated under a different operating system. The present invention allows a computer system to interface with an input/output device or a file in a normal state while the security device protects the computer system.

BACKGROUND OF THE INVENTION

The notion of controlling access to computer peripherals via a separate operating system is not new. For example, U.S. Pat. No. 5,434,562 for a Method For Limiting Computer Access to Peripheral Devices to Reardon discloses the use of user operated hardware switches to deny access to peripheral devices. Access to the switches can not be overridden by the computer. The purpose of this arrangement is to prevent unauthorized users or computer viruses from gaining an access to peripheral devices. Reardon '562, however, appears to contain solely mechanical switches without any software to operate them.

Another example is found in U.S. Pat. No. 5,202,997 for a Device For Controlling Access to Computer Peripherals to Arato. A microprocessor requests the user enter a valid identification code in order to gain access to a peripheral. When the user inputs an unauthorized code, the microprocessor will deny access to the peripheral. Arato is an example of software being used to provide security access to computer peripherals.

A similar example is found in U.S. Pat. No. 5,481,253 for an Automotive Security System to Phelan et al. discloses an anti-theft system includes a microprocessor based control module that enables operation of solenoids of the power circuits of the car only if a proper identification code is entered.

Finally, U.S. Pat. No. 5,311,591 for a Computer System Security Method And Apparatus For Creating And Using Program Authorization Information Data Structures to Fischer discloses a program authorization information required to gain access to various terminals. This is to prevent viruses from potentially destroying devices by moving from terminal to terminal. The co-signatory authority may be required in one embodiment as a security measure to prevent unauthorized access to devices.

What is needed is a hardware switching security device that is controlled by software operated under a different operating system so that access to and from peripheral devices may be controlled.

SUMMARY OF THE INVENTION

It is an object of the present invention to provide a security device for a digital computer system, operated under a different operating system by using hardware, that protects a computer system while allowing it to interface in a normal state with an input/output device or a file.

These and other objects may be achieved by having a security device for a digital computer system having a peripheral device and peripheral device control means that includes a security user input/output means which displays the contents stored to the peripheral device and receives information for the protection of the peripheral device, a security system control means which is connected to the security user input(output means, and protects and controls the peripheral device, a security control means which is connected to the security system control means, the peripheral device control means and the peripheral device, and protects the peripheral device from being controlled by the peripheral device control means.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In order to protect computer system from an unauthorized access, a screen locking system which interrupts the input of a keyboard and a mouse and a key locking system which restricts the operation of the computer system if the user does not press a set key when booting is used.

Many operating systems are used in one computer system because of the increase of the uses and applications for the computer. Under these systems, the above protecting methods are generally used.

In the above prior art, if the protector is not removed, the user can not use the entire computer system. Also, the above method which is used under one operating system can not be used in another operating system.

A preferred embodiment of the present invention will become apparent from a study of the following detailed description with reference to the accompanying drawings.

Figure 1:
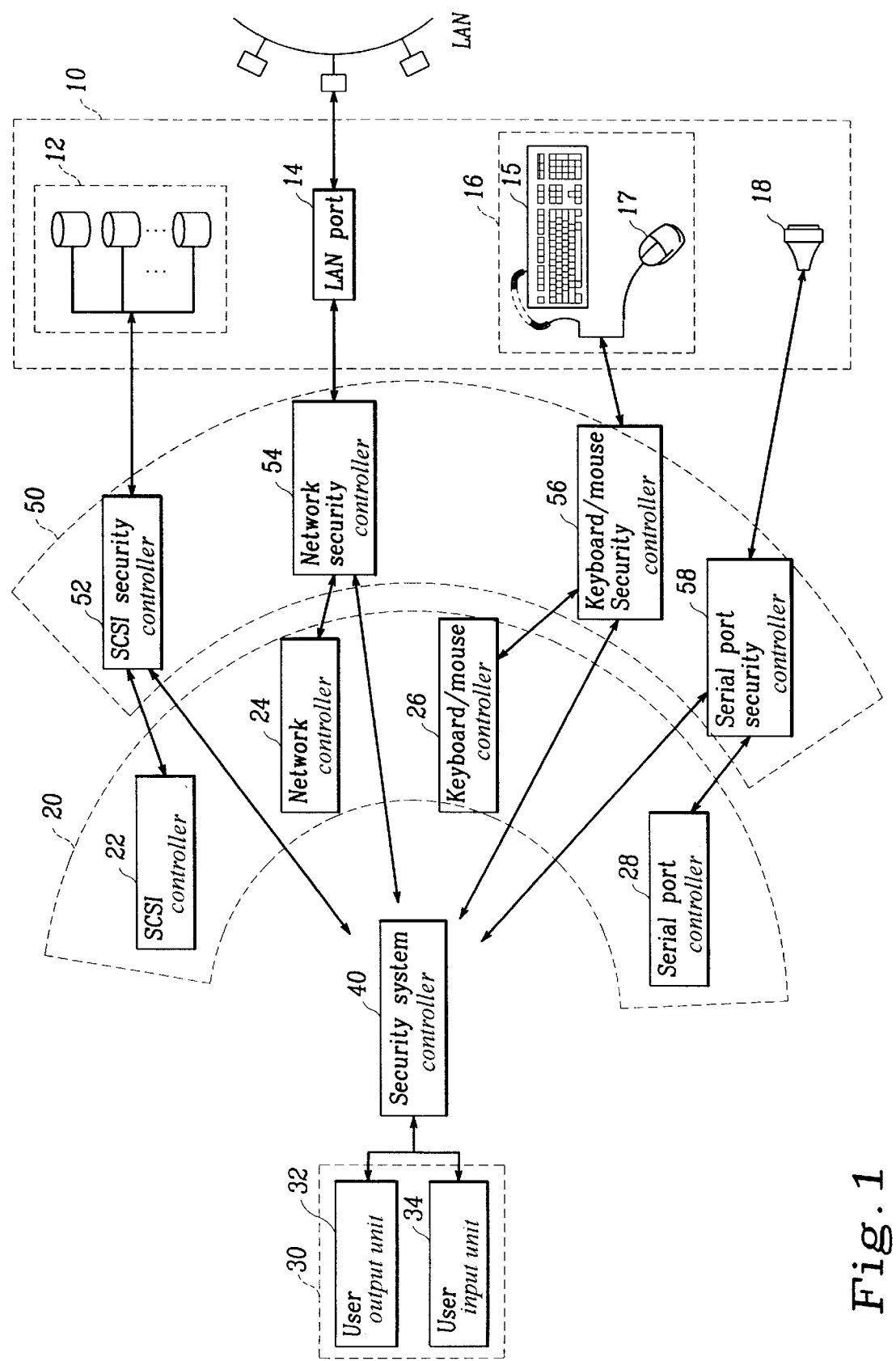
FIG. 1 is a schematic diagram of a digital computer system security device in accordance with the preferred embodiment of the present invention.

As shown in FIG. 1, the security device for a digital computer system having peripheral devices 10 and peripheral device controller 20 which controls the peripheral devices 10, includes a security user input/output unit 30 which displays the contents of peripheral devices 10 and receives information for the protection of the peripheral devices 10, a security system controller 40 which is connected to the security user input/output unit 30, and protects and controls the peripheral devices 10, and security controller 50 which is connected to the security system controller 40, the peripheral device controller 20 and the peripheral devices 10, and protects the peripheral device from being controlled by the peripheral device controller 20.

The peripheral devices 10 include a hard disk drive 12, a Local Area Network (LAN), a LAN port 14 connected to the LAN, a keyboard 15 and mouse 17 (16), and a serial port 18 for serial communication. The peripheral device controller 20 includes a Small Computer System Interface (SCSI) controller 22 for controlling the hard disk drive 12, network controller 24 for controlling the LAN port 14, a keyboard 15 and mouse controller 26 for controlling the keyboard and mouse 17 (16), and serial port controller 28 for controlling the serial port 18. The security controller 50 includes a SCSI security controller 52 which connected to the security system controller 40 and SCSI controller 22, and controls and protects the hard disk drive 12, network security controller 54 which is connected to the security system controller 40 and the network controller 24, and controls and protects the network port 14, keyboard/mouse security controller 56 which is connected to the security system controller 40 and the keyboard/mouse controller 26, and controls the keyboard/mouse 16, and serial port security controller 58 which is connected to the security system controller 40 and the serial port controller 28, and controls and protects the serial port 18.

The security user input/output unit 30 includes a user output unit 32 which receives the contents of the peripheral devices 10 from the security system controller 40 and displays the contents and user input unit 34 which receives information for the protection of the peripheral devices 10 from the user and transmits the information to the security system controller 40.

Figure 2:
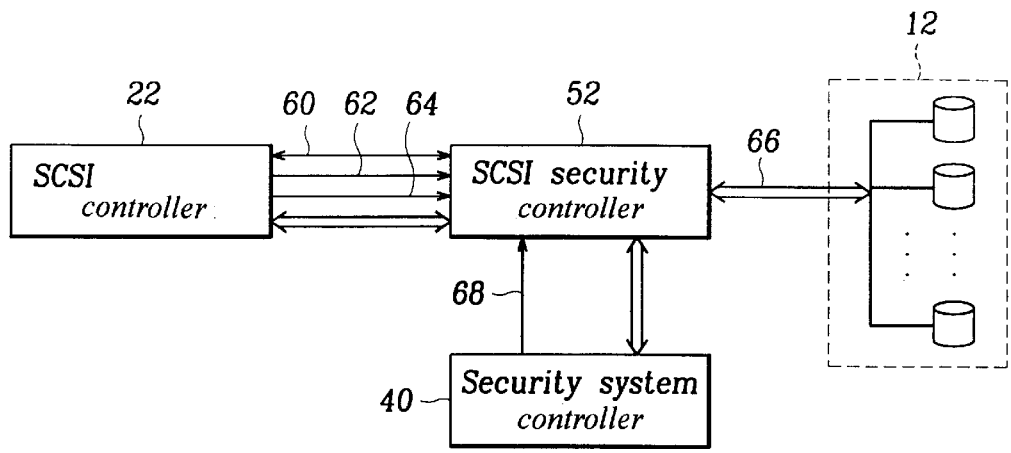
FIG. 2 is a security schematic diagram of a hard disk drive of the digital computer system security device in accordance with the preferred embodiment of the present invention.

As shown in FIG. 2, the SCSI security controller 52 transmits and receives data along data busses 66 and 60 when protection enable signal 68 is not activated.

Figure 3:
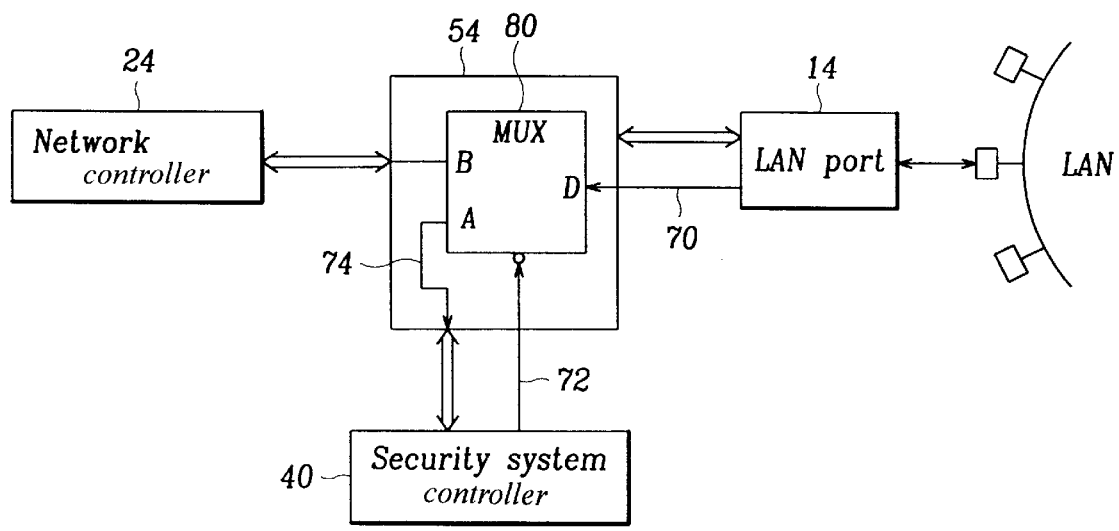
FIG. 3 is a security schematic diagram of a LAN port of the digital computer system security device in accordance with the preferred embodiment of the present invention.

As shown in FIG. 3, the network security controller 54 further includes a multiplexer 80. The multiplexer 80 receives a receive signal 70 among the output of the LAN port 14 and a protection-enable signal 72 among the output of the security system controller 40. Then, the multiplexer 80 outputs the receive signal 70 to the security system controller 40 if the protection-enable signal 72 is activated, and outputs the receive signal 70 to the network controller 24 if the protection-enable signal 72 is not activated.

Figure 4:
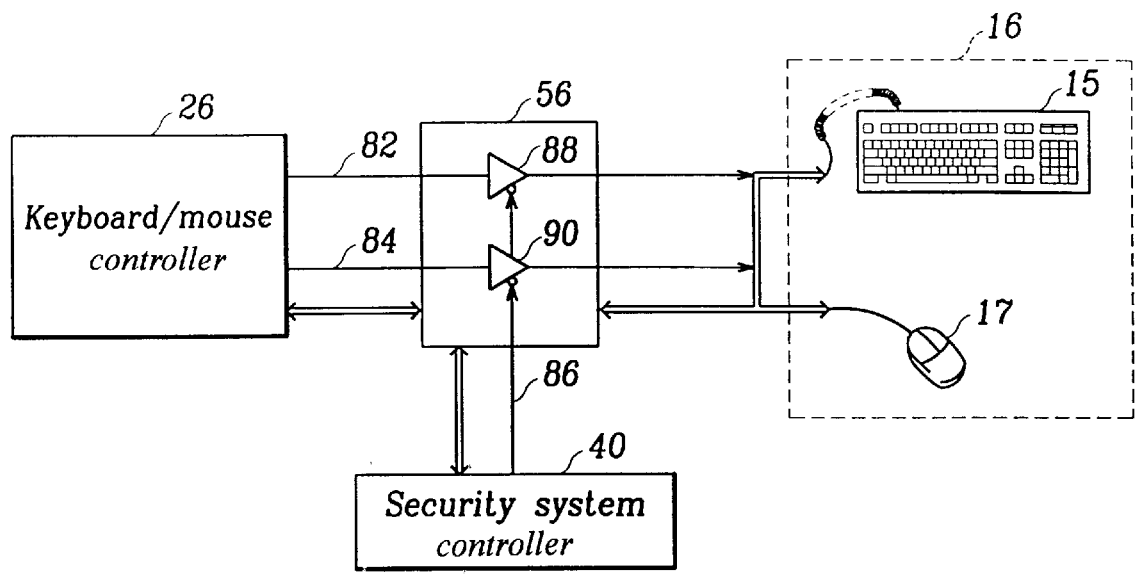
FIG. 4 is a security schematic diagram of a keyboard/mouse of the digital computer system security device in accordance with the preferred embodiment of the present invention.

As shown in FIG. 4, the keyboard/mouse security controller 56 includes a first buffer 88 and a second buffer 90. The first buffer 88 receives a keyboard-clock signal 82 from the keyboard/mouse controller 26, and outputs the keyboard-clock signal 82 if a protection-enable signal 86 from the security system controller 40 is not activated. The second buffer 90 receives a mouse-clock signal 84 from the keyboard/mouse controller 26, and outputs the mouse-clock signal 84 if the protection-enable signal 86 from the security system controller 40 is not activated.

Figure 5:
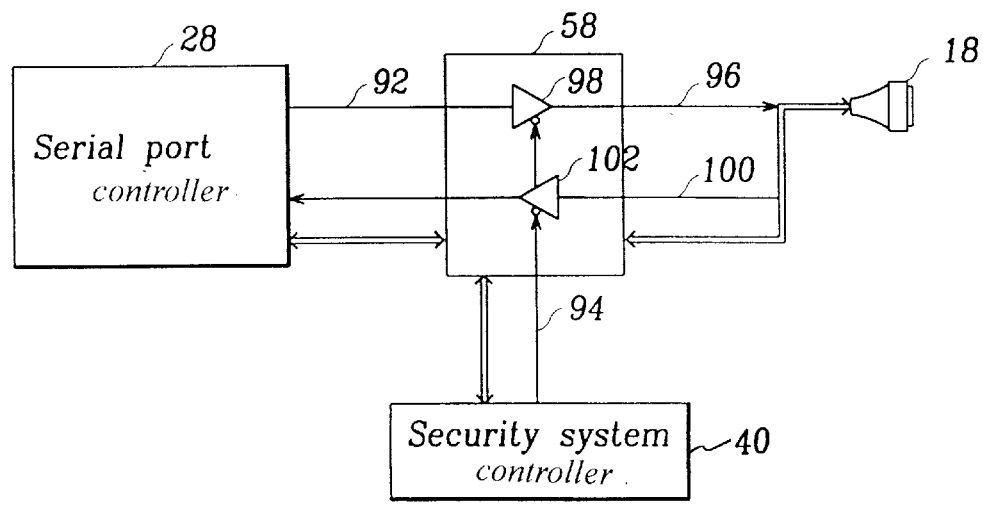
FIG. 5 is a security schematic diagram of a serial port of the digital computer system security device in accordance with the preferred embodiment of the present invention.

As shown in FIG. 5, the serial port security controller 58 includes a third buffer 98 and a fourth buffer 102. The third buffer 98 receives an output signal 92 from the serial port controller 28, and output the output signal 92 as an output transmit signal 96 if a protection-enable signal 94 from the security system controller 40 is not activated. The fourth buffer 102 receives a receive signal 100 from the serial port 18, and outputs the receive signal 100 to a serial port controller 28 if the protection-enable signal 94 from the security system controller 40 is not activated.

The operation of the security device for a digital computer system in accordance with the preferred embodiment of the present invention is as follows. The user selects the device that has to be protected through the security user input/output unit 30 among the hard disk drive 12, the LAN port 14, the keyboard/mouse 16 and the serial port 18. When the hard disk drive 12 is selected in the above selecting process and a SCSI ID (identification) of the hard disk drive 12 is inputted, the security system controller 40 outputs the Protection-Enable signal 68 and the information of the SCSI ID to the SCSI security controller 52. The SCSI security controller 52 monitors the access of the SCSI controller 22 to the hard disk drive 12. The access of the SCSI controller 22 to the hard disk drive 12 is shown in FIG. 2. The SCSI controller 22 outputs the value of the SCSI ID to a SCSI-Data-Bus 60 and makes the SCSI-SEL signal 62 activated. If the SCSI-SEL signal 62 is activated and the contents of the SCSI-Data-Bus 60 coincides with the value of the SCSI ID, the hard disk drive 12 is connected to the SCSI controller 22 by activating the SCSI-BUSY signal 64. The SCSI security controller 52 monitoring the access of the hard disk drive 12 compares the contents of the SCSI-Data-Bus 60 with the SCSI ID value of the hard disk drive 12 when the SCSI-SEL signal 62 is activated. If the contents of the SCSI-Data-Bus 60 coincides with the SCSI ID value of the hard disk drive 12, the SCSI security controller 52 prevents the SCSI-BUSY 64 signal from being input to the SCSI controller 22. Then, the SCSI security controller 52 resets the SCSI bus 66 and initializes each SCSI signals, so the hard disk drive 12 is protected. If the access to the hard disk drive 12 is sensed, the user is informed of the access to the hard disk drive 12 by an alarm. The result of the above operation is transmitted to the security user input/output unit 30 through the security system controller 40 and is then displayed.

If a network port 14 is selected and inputted among 10Base-T, Thick Network and Thin Network of the network port 14 selected in the above selecting process, the security system controller 40 activates and outputs the protection-enable signal 72. The, the multiplexer 80 of the network security controller 54 receives the activated signal 72 and outputs the receive signal 70 through an output line 74 to the security system controller 40 without connecting with the network controller 24. Therefore, the access to the LAN port 14 is protected. If the access to the LAN port 14 is sensed, the user is informed of the access to the LAN port 14 by an alarm. The user stores the signal 72 from the multiplexer 80 and uses the signal for tracing up the access. The result of the above operation is transmitted to the security user input/output unit 30 through the system controller 40 and is displayed.

If the keyboard/mouse 16 is selected in the above selecting process, the security system controller 40 activates and outputs the protection-enable signal 86. The first buffer 88 provides a clock capable of operating the keyboard 15 by outputting the keyboard-clock signal 82 inputted from the keyboard mouse controller 26. The keyboard-clock signal 82 receives and outputs the activated protection-enable signal 86. However, the first buffer 88 makes the keyboard not operable by interrupting the keyboard-clock signal 82. The second buffer 90 provides a clock capable of operating the mouse 17 by outputting the mouse-clock signal 84 inputted from the keyboard/mouse controller 26. The mouse-clock signal 84 receives and outputs the activated protection-enable signal 86. However, the second buffer 90 makes the mouse not be operated by interrupting the mouse-clock signal 84. The result of the above operation is transmitted to the user input/output unit 30 through the system controller 40 and is then displayed.

If the serial port 18 is selected in the above selecting process, the security system controller 40 activates and outputs the protection-enable signal 94. The output signal 92 inputted from the serial port controller 28 is outputted as the transmit signal 96 through the third buffer 98. The output signal 92 receives and outputs the activated protection-enable signal 94. The third buffer 98 prevents data from being outputted to the serial port 18 by interrupting the output signal 92. The fourth buffer 102 outputs the receive signal 100 inputted from the serial port 18 to the serial port controller 28. The receive signal 100 receives and outputs the activated protection-enable signal 94. The fourth buffer 102 prevents data from being inputted to the serial port controller 28 by interrupting the receive signal 100. The result of the above operation is transmitted to the user input/output unit 30 through the system controller 40 and is then displayed.

As mentioned above, the present invention provides a security device for a digital computer system, orated under another operating system by using hardware, that protects a computer system while allowing it to interface in a normal state with an input/output device or a file.

What is claimed is:

1. A security device for a digital computer system having at least one peripheral device and a peripheral device controller, comprising:

at least one peripheral device;

a peripheral device controller for said at least one peripheral device;

a security system controller, said security system controller for protecting and controlling said at least one peripheral device from being controlled by said peripheral device controller;

a security user input/output unit that is connected to said security system controller, said security user input/output unit for controlling activation of security for said at least one peripheral device, for transmitting information to and receiving information from said security system controller for protection of said at least one peripheral device, for providing an alarm for alerting of access to said at least one peripheral device, and for displaying contents stored in a peripheral device; and a security controller that is connected to said security system controller, said peripheral device controller and said at least one peripheral device, said security controller and said security system controller for providing a different operating system from said digital computer system for security for said at least one peripheral device.

2. The security device as claimed in claim 1, wherein said security user input/output unit comprises:

a user output unit for receiving the contents stored in said at least one peripheral device from said security system controller and for displaying the contents; and a user input unit for receiving the information for the protection of said at least one peripheral device from a user and for transmitting the information received from said user to said security system controller.

3. The security device as claimed in claim 2, wherein said user input unit is attached to a front side of the digital computer system and comprises one of a push button and a key pad.

4. The security device as claimed in claim 2, wherein said user output unit is attached to a front side of the digital computer system so that the user can see outputted data, wherein said user output unit produces said alarm when access to said at least one peripheral device has occurred.

5. The security device as claimed in claim 1, wherein the digital computer system includes a plurality of peripheral devices comprising a hard disk drive, a LAN port, a keyboard/mouse and a serial port, said peripheral device controller comprises a SCSI controller, a network controller, a keyboard/mouse controller and a serial port controller, and said security controller comprises:

a SCSI security controller that is connected to said security system controller and to said SCSI controller, said SCSI security controller for controlling and protecting said hard disk drive;

a network security controller that is connected to said security system controller and to said network controller, said network security controller for controlling and protecting said LAN port;

a keyboard/mouse security controller that is connected to said security system controller and to said keyboard/mouse controller, said keyboard/mouse security controller for controlling and protecting said keyboard/mouse; and a serial port security controller that is connected to said security system controller and to said serial port controller, said serial port security controller for controlling and protecting said serial port.

6. The security device as claimed in claim 5, wherein said SCSI security controller is for receiving a protection-enable signal from said security system controller, said SCSI controller for allowing input and output of information along a SCSI bus and a SCSI-Data-Bus if the protection-enable signal from said security system controller is not activated.

7. The security device as claimed in claim 5, wherein said network security controller comprises:

a multiplexer, said multiplexer for receiving a receive signal among the output of said LAN port and a protection-enable signal among the output of said security system controller, said multiplexer for outputting the receive signal to said security system controller if the protection-enable signal is activated and for outputting the receive signal to said network controller if the protection-enable signal is not activated.

8. The security device as claimed in claim 5, wherein said keyboard/mouse security controller comprises:

a first buffer for receiving a keyboard-clock signal from said keyboard/mouse controller, said first buffer for outputting the keyboard-clock signal if a protection-enable signal from said security system controller is not activated; and a second buffer for receiving a mouse-clock signal from said keyboard/mouse controller, said second buffer for outputting the mouse-clock signal if said protection-enable signal from said security system controller is not activated.

9. The security device as claimed in claim 5, wherein said serial port security controller comprises:

a first buffer for receiving an output signal from said serial port controller, said first buffer for outputting the output signal as an output transmit signal if a protection-enable signal from said security system controller is not activated; and a second buffer for receiving a receive signal from said serial port, said second buffer for outputting the receive signal to said serial port controller if said protection-enable signal from said security system controller is not activated.

10. A method of protecting a peripheral device in a computer system from unwanted access, comprising the steps of:

providing a different operating system from said computer system for security for said at least one peripheral device, inputting into said operating system an identification code for each peripheral device to be protected;

outputting a protection enable signal by said operating system for each said peripheral device to be protected for preventing access to each protected peripheral device;

attempting to send and receive data from at least one said protected peripheral device; p1 denying transmittal and receipt of data to and from said at least one protected peripheral device;

sensing access has been attempted to said at least one protected peripheral device; and informing a user that access to said at least one protected peripheral device has been attempted and prevented.

11. The method of claim 10, further comprising the steps of:

attempting to send and receive data from an unprotected peripheral device;

sending and receiving data from said unprotected peripheral device; and displaying data received from said unprotected peripheral device to said user.

12. A security protection system for a computer peripheral of a computer system, comprising:

at least one computer peripheral;

a peripheral controller for controlling said at least one computer peripheral;

a security controller for controlling access to said at least one computer peripheral;

a security system controller for controlling said security controller, said security system controller and said security controller for providing a different operating system from said computer system for security for at least one computer peripheral;

a user input and output unit that is connected to said security system controller, said user input and output unit for controlling activation of security for at least one selected computer peripheral by allowing a user to activate security for said at least one selected computer peripheral, for transferring information to and receiving information from said security system controller for protection of said at least one selected computer peripheral, for alerting said user of access to said at least one selected computer peripheral, and for displaying data from a computer peripheral.

13. The security protection system of claim 12, wherein said user input and output unit alerts the user when access has been attempted to said at least one selected computer peripheral for which security has been activated and access to said at least one selected computer peripheral has been denied.

14. The security protection system of claim 12, wherein said user input and output unit is for displaying data retrieved from a computer peripheral where security has not been activated.

15. The security protection system of claim 12, wherein said security system controller is for protecting said at least one selected computer peripheral from being controlled by said peripheral controller.

16. The security protection system of claim 12, wherein said user input and output unit alerts the user when access has been attempted to said at least one selected computer peripheral for which security has been activated and access to said at least one selected computer peripheral has been denied, and wherein said user input and output unit is for displaying data retrieved from a computer peripheral where security has not been activated.

17. The security protection system of claim 12, wherein said user input and output unit alerts the user when access has been attempted to said at least one selected computer peripheral for which security has been activated and access to said at least one selected computer peripheral has been denied, and wherein said security system controller is for protecting said at least one selected computer peripheral from being controlled by said peripheral controller.

18. The security protection system of claim 12, wherein said user input and output unit is for displaying data retrieved from a computer peripheral where security has not been activated, and wherein said security system controller is for protecting said at least one selected computer peripheral from being controlled by said peripheral controller.

19. The security protection system of claim 18, wherein said user input and output unit alerts the user when access has been attempted to said at least one selected computer peripheral for which security has been activated and access to said at least one selected computer peripheral has been denied.

20. The security device as claimed in claim 5, wherein:

said SCSI security controller is for receiving a first protection-enable signal from said security system controller, said SCSI controller for allowing input and output of information along a SCSI bus and a SCSI-Data-Bus if the first protection-enable signal from said security system controller is not activated;

said network security controller comprises a multiplexer, said multiplexer for receiving a receive signal among the output of said LAN port and a second protection-enable signal among the output of said security system controller, said multiplexer for outputting the receive signal to said security system controller if the second protection-enable signal is activated and for outputting the receive signal to said network controller if the second protection-enable signal is not activated;

said keyboard/mouse security controller comprises a first buffer for receiving a keyboard-clock signal from said keyboard/mouse controller, said first buffer for outputting the keyboard-clock signal if a third protection-enable signal from said security system controller is not activated, and a second buffer for receiving a mouse-clock signal from said keyboard/mouse controller, said second buffer for outputting the mouse-clock signal if said third protection-enable signal from said security system controller is not activated; and said serial port security controller comprises a third buffer for receiving an output signal from said serial port controller, said third buffer for outputting the output signal as an output transmit signal if a fourth protection-enable signal from said security system controller is not activated, and a fourth buffer for receiving a receive signal from said serial port, said fourth buffer for outputting the receive signal to said serial port controller if said fourth protection-enable signal from said security system controller is not activated.

* * * * *